April 17, 1945.   A. J. MASLIN   2,374,029
RECTIFIER TRANSFORMER
Original Filed June 18, 1940   2 Sheets-Sheet 1
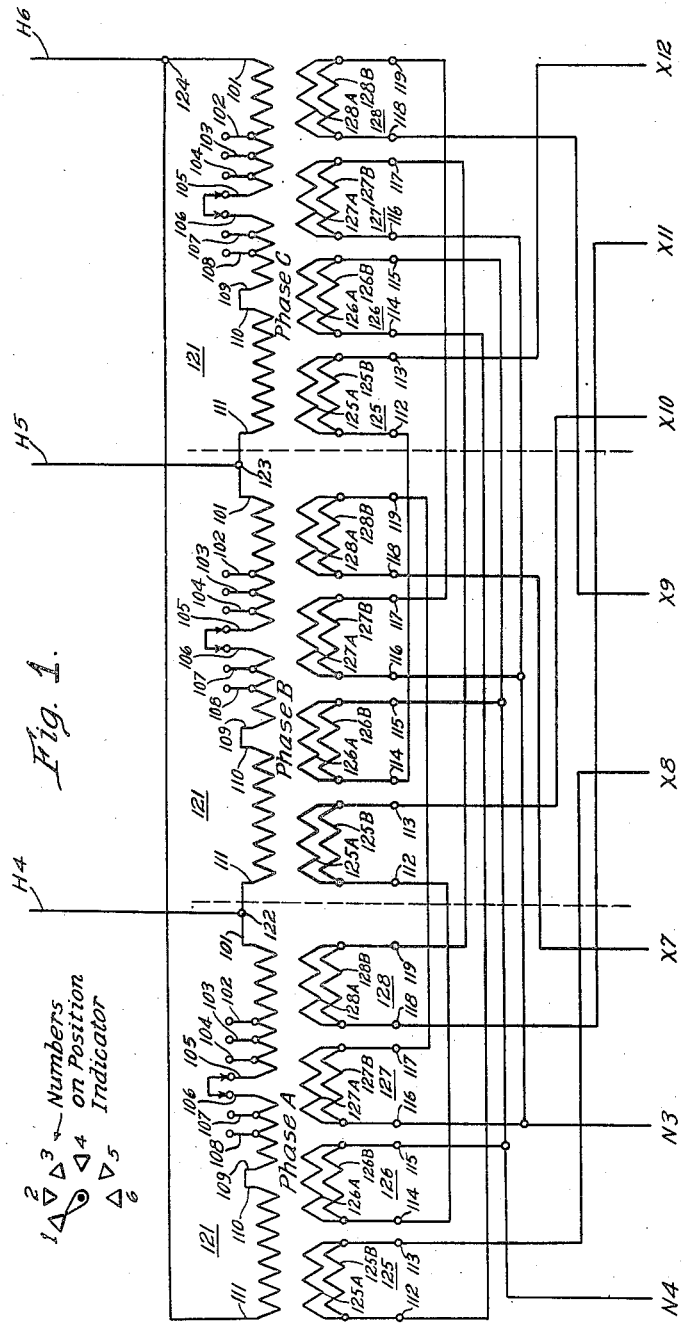
Fig. 1.
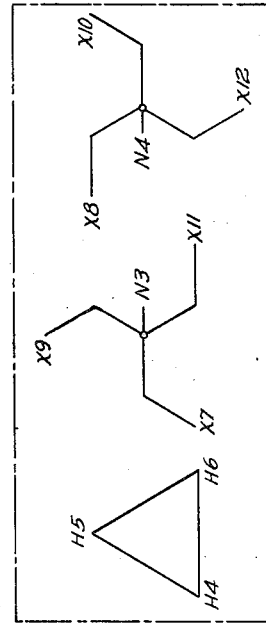
Fig. 3.
| Tap Changer | |
|---|---|
| Position | Connects |
| 1 | 105 to 106 |
| 2 | 104 to 106 |
| 3 | 104 to 107 |
| 4 | 103 to 107 |
| 5 | 103 to 108 |
| 6 | 102 to 108 |
Fig. 2.
WITNESSES:
C. J. Weller
Wm. C. Groome
INVENTOR
Albert J. Maslin.
BY Franklin E. Hardy
ATTORNEY April 17, 1945. A. J. MASLIN 2,374,029
RECTIFIER TRANSFORMER
Original Filed June 18, 1940 2 Sheets-Sheet 2
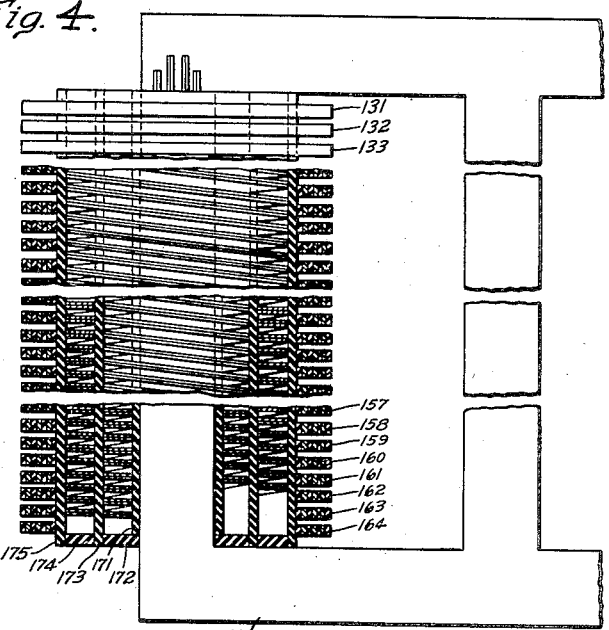
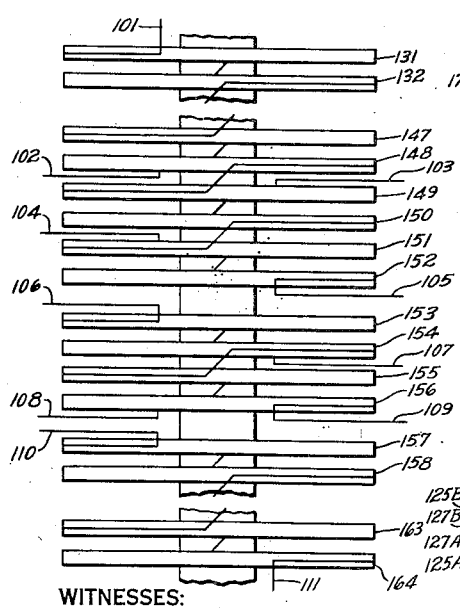
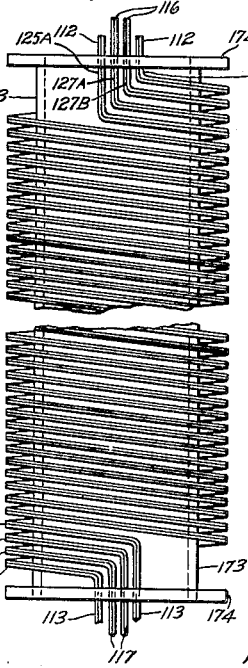
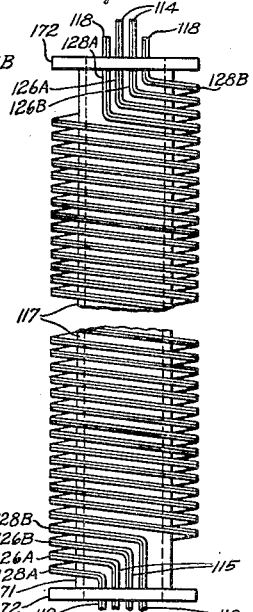
INVENTOR
Albert J. Maslin.
BY
Franklin E. Hardy
ATTORNEY Patented Apr. 17, 1945

2,374,029

UNITED STATES PATENT OFFICE 2,374,029

RECTIFIER TRANSFORMER

Albert J. Maslin, Sharon, Pa., assignor to Westinghouse Electric & Manufacturing Company, East Pittsburgh, Pa., a corporation of Pennsylvania Original application June 18, 1940, Serial No. 341,107. Divided and this application February 10, 1943, Serial No. 475,413

10 Claims. (Cl. 175—356)

This invention relates to electrical induction apparatus such as transformers used for supplying alternating-current energy to mercury arc power rectifiers and the like.

This application is a division of my copending application for rectifier transformers Serial No. 341,107 filed June 18, 1940, and assigned to the same assignee as this application.

In order to obtain a direct current voltage from a power rectifier having the desired characteristics, it is necessary to apply an alternating current power supply usually of six phases or more of a voltage having a definite relation to the direct current voltage to the anodes of the rectifier. Usually, the rectifier is supplied from a three-phase alternating current system having a voltage that differs from that required to be supplied to the anodes. Therefore, a transformer is required between the power supply and the rectifier to transform the available alternating current energy to the proper voltage and number of phases required for the anodes.

Rectifier transformers differ from ordinary power transformers used for transforming alternating current power from one voltage to alternating current power of another voltage because of the different character of the load on the secondary of the transformer. The usual power transformer or distribution transformer supplies a load having a substantially constant impedance per phase over the whole cycle of alternating current voltage. A rectifier transformer, on the other hand, carries current only during part of an alternating current cycle because of the valve action of the rectifier which permits current flow through the anode in one direction only.

It is desirable that rectifier transformers have as low a leakage reactance as possible. The transformer must, however, be capable of limiting the current flow therethrough in the case of short circuits. Because of the unsymmetrical load on the secondary windings of a rectifier transformer, it is desirable that these windings be so arranged and distributed with respect to the primary windings and to each other that balanced magnetic conditions exist under normal or abnormal working conditions.

Rectifier transformers are also subject to very high stresses during a backfire such as may result from the failure of the valve action of one or more of the anodes. During normal operation of a rectifier, the valve action is such that current normally flows only from the anode to the cathode. If, however, a cathode spot develops for any reason on one of the anodes, current from the other anodes will flow to the backfiring anode, thus forming a short circuit within the apparatus. The current flowing through such a backfiring anode is limited only by the resistance and reactance of the transformer windings.

In order to minimize the forces occurring during short circuits or backfire, it is necessary that the leakage field of all secondary windings occupy as nearly as possible the same space within the transformer and that the windings be so disposed with respect to each other that they are balanced magnetically. The former provision serves to reduce the force exerted on a given winding during short circuit conditions when several windings are involved below the value that would exist if the leakage field of each winding had its own separate path. The latter provision serves to eliminate undesirable components of force due to displaced magnetic centers.

An object of the present invention is the provision of a rectifier transformer having the maximum ability to withstand short circuits and backfires of the rectifier.

Other objects and advantages of the invention will be apparent from the following description of preferred embodiments of the invention, reference being had to the accompanying drawings, in which:

Figure 1 is a diagrammatic view of connections of a three-phase transformer comprising an embodiment of the invention arranged to supply six rectifier anodes;

Fig. 2 is a chart showing the tap connections for different positions of the tap changing switch for the embodiment illustrated in Fig. 1.

Fig. 3 is a polarity diagram of the connections of the windings shown in Fig. 1;

Fig. 4 is a view partly in section showing the arrangement of the windings about one winding leg of a core structure corresponding to one of the three phases shown diagrammatically in Fig. 1;

Fig. 5 is a diagrammatic view of the connections of the coils comprising the high-voltage winding shown in Fig. 4; and Figs. 6 and 7 are elevational views of the low-voltage windings of the transformers shown in Fig. 4.

Referring to the embodiment of the invention illustrated in Figs. 1 to 7, inclusive, and particularly to Fig. 1, three high-voltage circuit conductors H4, H5 and H6 are provided for supplying the high-voltage side of the transformer and six low-voltage terminals X7 to X12, inclusive, are provided for supplying current to six rectifier anodes, the several winding parts of the high and low-voltage windings being connected together, as shown, by the polarity diagram in Fig. 3, which corresponds to the circuit diagram of Fig. 1. On each phase of the three-phase core structure similar sets of winding groups are provided, indicated in Fig. 1 as phases A, B and C, respectively. The corresponding parts of the groups of each of these three phases are similarly numbered in the diagram of Fig. 1. Each of the high-voltage windings 121 is provided with tap or terminal conductors 101 to 111, inclusive. The high-voltage windings of phase A are connected between junction point 122 on conductor H4 and junction point 124 on conductor H6. The high-voltage windings of phase B are connected between junction points 122 and 123 on conductors H4 and H5, respectively, and the high-voltage windings of phase C are connected between junction points 123 and 124 on phase conductors H5 and H6, respectively.

Each of the three phases of the transformer is provided with four low-voltage windings 125, 126, 127 and 128 connected between associated pairs of terminals numbered 112 to 119, inclusive, as shown in Fig. 1, and each of these windings comprising two parallel conductors designated with the number of the completed winding followed by the letter A or B. For example, the winding 125 comprises the two parallel connected conductors 125A and 125B.

Referring to Figs. 4 and 5, the high-voltage winding 121 comprises a plurality of disc-type coils 131 and 164, inclusive. The figures are broken in parts to reduce the dimension of the drawings so that in Fig. 5, for example, the coils 133 to 146, inclusive, and 159 to 162, inclusive, are omitted. As best shown in Figs. 6 and 7, the low-voltage windings consist of eight conductors each wound in the form of a helix, each of the conductors extends for the full length of the winding and is arranged in the form of two cylindrical spool structures, one within the other. The two parallel connected conductors of each of the windings shown diagrammatically in Fig. 1 are positioned in balanced relation to the other two conductors of the associated winding on the same spool. For example, referring to Fig. 6, the conductor 125A and conductor 125B are the two outer of the four edgewound interleaved conductors and have common terminals 112 and 113 connected together, as shown in Fig. 1. Likewise, the two conductors 127A and 127B are positioned between conductors 125A and 125B so that the entire four conductors have a common magnetic center and are symmetrically disposed so that, in effect, they occupy the same positions.

Similarly, referring to Fig. 7, the two conductors 126A and 126B that are connected in parallel between terminals 114 and 115 are positioned between conductors 128A and 128B spaced on opposite sides of conductors 128A and 128B and connected in parallel between terminals 118 and 119. The edgewound conductors shown in Fig. 7 are positioned about a central tubular insulating member 171 having flanges 172 at each end, and, as best shown in Fig. 4, are disposed closely about the winding leg of the core structure 176. The several helically wound conductors shown in Fig. 6 are similarly positioned about a central tubular insulating member 173 having end flanges 174 which surround the inner winding structure comprising the conductors 128A, 128B and 126A, 126B, shown in Fig. 7. The high-voltage winding, comprising the flat disc-type coils 131 to 134, inclusive, is positioned about a tubular insulating member 175 which surrounds the group of windings comprising the conductor 125A, 125B and 127A, 127B.

It will be appreciated from the construction herein described that the secondary windings of the several phases of the transformer are closely coupled and so positioned as to be balanced magnetically. The arrangement of the several conductors comprising the several secondary windings is such that the leakage field of these windings occupy the same space within the transformer.

It will be appreciated that a completed transformer consists either of a core structure having three winding legs about each of which a complete set of high and low-voltage windings are positioned corresponding to each of the three phases of the transformer or of three single-phase transformers having the illustrated and described arrangement of the groups of high and low-voltage windings are provided. It will likewise be appreciated that, if desired, the arrangement of three cylindrical winding structures, such as shown in Figs. 5, 6 and 7, may be used for each half of the winding structure.

Many modifications in the circuits and apparatus illustrated and described within the spirit of my invention will occur to those skilled in the art, and I do not wish to be limited otherwise than by the scope of the appended claims.

I claim as my invention:

1. Electrical apparatus comprising inductively related high-voltage and low-voltage windings disposed about the winding leg of a core structure, each low-voltage winding comprising a plurality of pairs of parallel connected coils, each coil consisting of a conductor having a single layer of successive turns progressing in the same direction about an axis at a constant radius therefrom to form a helix, the several conductors being interleaved and those comprising one pair being positioned between the conductors comprising another pair to establish a balanced magnetic coil structure in which the several windings have the same magnetic center.

2. Electrical apparatus comprising inductively related high-voltage and low-voltage windings disposed about the winding leg of a core structure, each low-voltage winding comprising a plurality of pairs of parallel connected coils, each coil consisting of a flat ribbon shaped conductor wound edgewise as a helix and having a single layer of successive turns progressing in the same direction about an axis at a constant radius therefrom, the coils being arranged in groups, the several conductors comprising the coils of one group having the same outer and inner diameters and being interleaved, and those conductors comprising one pair being positioned between the conductors comprising another pair to establish a balanced magnetic coil structure in which the several windings have the same magnetic center.

3. Electrical apparatus comprising inductively related high-voltage and low-voltage windings disposed about the winding leg of a core structure, the low-voltage winding comprising a plurality of concentrically positioned spools of winding conductors, each spool supporting a low-voltage winding comprising a plurality of pairs of parallel connected coils, each coil consisting of a conductor having a single layer of successive turns progressing in the same direction about an axis at a constant radius therefrom to form a helix, the several conductors in each spool being interleaved and those comprising one pair being between the conductors comprising another pair to establish a balanced magnetic coil structure in which the several windings have the same magnetic center.

4. Electrical apparatus comprising inductively related high-voltage and low-voltage windings disposed about the winding leg of a core structure, the low voltage winding comprising a plurality of concentrically positioned spools of winding conductors, each spool supporting a low-voltage winding comprising a pair of parallel connected coils, each coil consisting of a conductor having a single layer of successive turns progressing in the same direction about an axis at a constant radius therefrom to form a helix, the several turns of the separate conductors in each spool being interleaved with like turns of an adjacent conductor, the high-voltage winding comprising a plurality of disc-type coils connected in series and positioned about the low-voltage winding.

5. In a three phase electrical induction apparatus, a core having a winding leg for each phase, each of the three phases being provided with four low-voltage windings connected between associated pairs of terminals and each winding comprising two parallel conductors, the conductors being arranged in two groups mounted on two concentrically positioned spools of winding conductors, each spool supporting a low-voltage winding comprising a pair of parallel connected coils, each coil consisting of a conductor having a single layer of successive turns progressing in the same direction about an axis at a constant radius therefrom to form a helix, the several conductors in each spool being interleaved and those comprising one pair being between the conductors comprising another pair to establish a balanced magnetic coil structure in which the several windings have the same magnetic center.

6. Electrical apparatus comprising inductively related high-voltage and low-voltage windings disposed about the winding leg of a core structure, each low-voltage winding comprising pairs of parallel connected coils, each coil consisting of a flat ribbon shaped conductor wound edgewise and having a single layer of successive turns progressing in the same direction about an axis at a constant radius therefrom to form a helix, the several conductors being interleaved and those conductors comprising one pair of parallel connected coils being positioned between the conductors comprising another pair of parallel connected coils to establish a balanced magnetic coil structure in which the several windings have the same magnetic center.

7. Electrical apparatus comprising inductively related high-voltage and low-voltage windings disposed about the winding leg of a core structure the low-voltage windings being connected between associated pairs of terminals and each winding comprising a pair of parallel connected coils, the coils being arranged in two concentrically positioned spools of winding conductors, each spool supporting a pair of parallel connected coils, each coil consisting of a flat ribbon shaped conductor wound edgewise as a helix and having a single layer of successive turns progressing in the same direction about an axis at a constant radius therefrom, the coils in each spool being arranged in groups, the several conductors comprising the coils of one spool having the same outer and inner diameters and being interleaved, and those conductors comprising one pair of parallel connected coils being positioned between the conductors comprising another pair of parallel connected coils to establish a balanced magnetic coil structure in which the several windings have the same magnetic center.

8. Electrical apparatus comprising inductively related high-voltage and low-voltage windings disposed about the winding leg of a core structure, the low voltage winding group comprising a plurality of concentrically positioned spools of winding conductors, each spool supporting a pair of low-voltage windings, each winding comprising a pair of parallel connected coils, each coil consisting of a flat ribbon shaped conductor wound edgewise and having a single layer of successive turns progressing in the same direction about an axis at a constant radius therefrom to form a helix, the several conductors in each spool being interleaved and those conductors comprising one pair of coils being between the conductors comprising another pair of coils to establish a balanced magnetic coil structure in which the several windings, each having a pair of coils, have the same magnetic center.

9. Electrical apparatus comprising inductively related high-voltage and low-voltage windings disposed about the winding leg of a core structure, the low voltage winding group comprising a plurality of concentrically positioned spools of winding conductors, each spool supporting a low-voltage winding comprising a pair of parallel connected coils, each coil consisting of a flat ribbon shaped conductor wound edgewise and having a single layer of successive turns progressing in the same direction about an axis at a constant radius therefrom to form a helix, the several turns of the separate conductors in each spool being interleaved with like turns of an adjacent conductor, the high-voltage winding comprising a plurality of disc-type coils connected in series and positioned about the low-voltage winding.

10. In a three phase electrical induction apparatus, a core having a winding leg for each phase, each of the three phases being provided with four low-voltage windings connected between associated pairs of terminals and each winding comprising two parallel conductors, the conductors being arranged in two groups mounted on two concentrically positioned spools of winding conductors, each spool supporting a low-voltage winding comprising a pair of parallel connected coils, each coil consisting of a flat ribbon shaped conductor wound edgewise and having a single layer of successive turns progressing in the same direction about an axis at a constant radius therefrom to form a helix, the several turns of the separate conductors in each spool being interleaved with like turns of an adjacent conductor, the high-voltage winding comprising a plurality of disc type coils connected in series and positioned about the low-voltage winding.

ALBERT J. MASLIN.